A. THOMPSON.
Improvement in Cultivators.
No. 129,693.  Patented July 23, 1872.
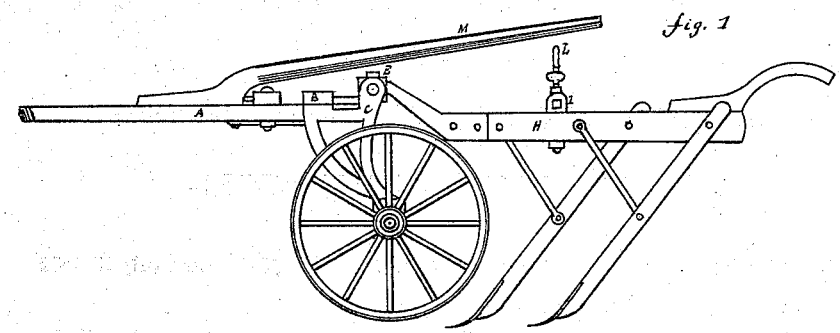
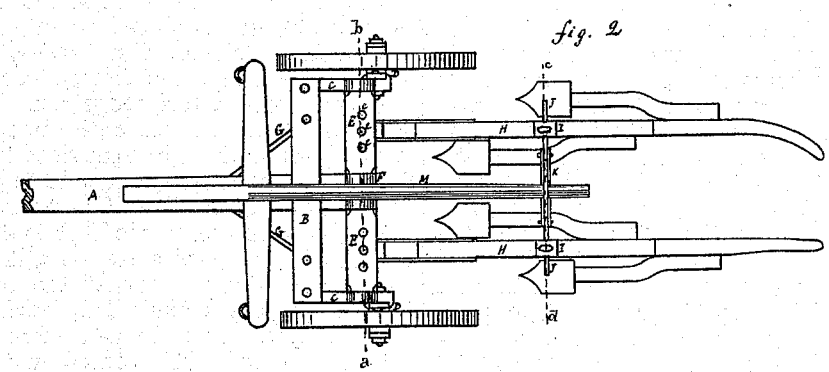
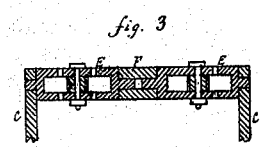
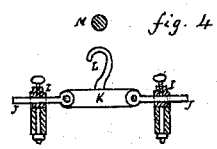
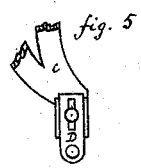
Witnesses:  Inventor:

UNITED STATES PATENT OFFICE.

ANDREW THOMPSON, OF OTTAWA, ILLINOIS.

IMPROVEMENT IN CULTIVATORS.

Specification forming part of Letters Patent No. 129,693, dated July 23, 1872.

Specification describing certain Improvements in Cultivators, invented by ANDREW THOMPSON, of Ottawa, in the county of La Salle and State of Illinois.

The first part of my invention consists in attaching the beams of a cultivator at a point above the tongue to which the horses are harnessed; the object of this part of my invention being to cause the tongue to be raised by the resistance of the plows, instead of being thereby forced downward, as is the case with other cultivators, so that other devices have to be resorted to to counteract this downward pressure in order to relieve the weight from the horse's neck. My invention produces this result at once without the assistance of any secondary device. The second part of my invention consists in the application of adjustable slides to the wheels, whereby the same can be raised or lowered in order to adjust the pitch of the shovels and the depth of plowing. The third part of my invention consists in an improved device to unite together the two beams and to make the distance between them adjustable, having also attached thereto a hook for suspending the beams off from the ground.

Figure 1 is a side elevation of a machine embodying my invention. Fig. 2 is a plan of the same. Fig. 3 is a vertical transverse section taken through the line $a\ b$, Fig. 2. Fig. 4 is a vertical transverse section taken through the line $c\ d$, Fig. 2. Fig. 5 is an elevation, showing one of the adjustable slides to which the wheels are attached.

A is the tongue of the machine, to which a cross-piece, B, is attached. This cross-piece B has bolted to it the two frame-castings C C, to which the wheels are attached by means of the adjustable slides D D. Between these frame-castings C C are placed the cross-heads E E, having trunnions at each end, which oscillate in the frame-castings C C, and also in the center piece F, placed directly on the rear end of the tongue A. Two braces, G G, brace the tongue A and the frame-pieces C C with the cross-piece B firmly together. The beams H H have heads fitted onto them, which are bent upward and fit into the slots of the cross-heads E E, where they are held in position by means of a pin or a bolt. The variation of the space between the beams H H is obtained by means of a series of holes, $e\ e\ e$, in the cross-heads E E. On the top of the beams H H are placed the swivels I I, having square-shaped holes through them, through which pass square rods J J, secured in the desired position by thumb-screws. These rods J J are linked to a center piece, K, which has in its middle the hook L, which hooks onto the pole M when the machine is being moved to and from the field. The standards and shovels are constructed in the usual manner.

I do not claim the several parts herein described separately, all of which I know to be old; but

What I claim is—

The general combination of the following parts with each other, to wit, the tongue A, cross-piece B, the frame-castings C C, the cross-heads E E, the beams H H, and the adjustable slides D D, substantially as and for purposes described.

ANDREW +his THOMPSON.
mark.

Witnesses:
   A. J. WILLIAMSON,
   EDWARD ROSE.